(12) United States Patent
Inoue et al.

(10) Patent No.: US 9,687,007 B2
(45) Date of Patent: Jun. 27, 2017

(54) POULTRY TENDERLOIN EXTRACTION APPARATUS

(71) Applicant: MAYEKAWA MFG. CO., LTD., Tokyo (JP)

(72) Inventors: Noriyuki Inoue, Tokyo (JP); Shinji Hane, Tokyo (JP); Kenichi Oka, Tokyo (JP); Koji Takanashi, Tokyo (JP); Naoki Toyoda, Tokyo (JP); Hiroyuki Sakurayama, Tokyo (JP); Noriyuki Takahashi, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 15/322,730

(22) PCT Filed: Jun. 25, 2015

(86) PCT No.: PCT/JP2015/068358
§ 371 (c)(1),
(2) Date: Dec. 29, 2016

(87) PCT Pub. No.: WO2016/002628
PCT Pub. Date: Jan. 7, 2016

(65) Prior Publication Data
US 2017/0127689 A1    May 11, 2017

(30) Foreign Application Priority Data

Jun. 30, 2014  (JP) .................................. 2014-134086
Jun. 30, 2014  (JP) .................................. 2014-134087
Jun. 30, 2014  (JP) .................................. 2014-134088

(51) Int. Cl.
*A22C 21/00*     (2006.01)
*B26D 7/02*      (2006.01)
*B26D 3/24*      (2006.01)

(52) U.S. Cl.
CPC ................ *A22C 21/00* (2013.01); *B26D 3/24* (2013.01); *B26D 7/02* (2013.01)

(58) Field of Classification Search
CPC . A22C 21/00; A22C 21/0023; A22C 21/0038; A22C 21/0046
(Continued)

(56) References Cited

U.S. PATENT DOCUMENTS

| | | |
|---|---|---|
| 5,312,291 A | 5/1994 | van den Nieuwelaar et al. |
| 5,314,374 A | 5/1994 | Koch et al. |

(Continued)

FOREIGN PATENT DOCUMENTS

| | | |
|---|---|---|
| JP | H067074 | 1/1994 |
| JP | H11266780 | 10/1999 |

(Continued)

OTHER PUBLICATIONS

"International Search Report (Form PCT/ISA/210)", mailed on Oct. 6, 2015, with English translation thereof, pp. 1-2.

(Continued)

*Primary Examiner* — Richard Price, Jr.
(74) *Attorney, Agent, or Firm* — Jianq Chyun IP Office

(57) ABSTRACT

A poultry tenderloin extraction apparatus is provided that can achieve higher poultry tenderloin extracting process performance without posing a risk of bone chips mixing in the poultry tenderloin. The poultry tenderloin extraction apparatus includes: a fixing jig configured to move while holding a poultry carcass; a poultry tenderloin extraction body section disposed on each of left and right sides with respect to a conveying direction of the fixing jig; a first moving unit configured to move the poultry tenderloin extraction body section toward the moving fixing jig; and a second moving unit configured to move the poultry tenderloin extraction body section away from the moving fixing (Continued)

jig. The poultry tenderloin extraction body section includes a clamping device including: a clamping lower plate to be inserted under the poultry tenderloin in a width direction relative to a longitudinal direction of the poultry tenderloin of the poultry carcass held by the fixing jig; and a clamping upper plate to be supported above the poultry tenderloin, the clamping device being configured to clamp the poultry tenderloin between the clamping lower plate and the clamping upper plate when the poultry tenderloin extraction body section moves toward the fixing jig. The apparatus is configured to, while the poultry tenderloin is clamped between the clamping lower plate and the clamping upper plate, separate the poultry tenderloin from the poultry carcass by a movement of the fixing jig toward a front side in the conveying direction and a movement of the poultry tenderloin extraction body section away from the fixing jig by the second moving unit.

7 Claims, 14 Drawing Sheets

(58) Field of Classification Search
USPC .................................. 452/149, 166, 170, 194
See application file for complete search history.

(56) References Cited

U.S. PATENT DOCUMENTS

| | | | | |
|---|---|---|---|---|
| 5,368,520 | A * | 11/1994 | Koch | A22C 21/0023 |
| | | | | 452/136 |
| 5,954,574 | A | 9/1999 | Verrijp et al. | |
| 6,007,416 | A * | 12/1999 | Janssen | A22C 21/003 |
| | | | | 452/135 |
| 6,042,469 | A * | 3/2000 | Wagner | A22C 17/02 |
| | | | | 269/238 |
| 6,059,648 | A | 5/2000 | Kodama et al. | |
| 6,935,942 | B1 | 8/2005 | Evers et al. | |
| 2006/0270331 | A1 | 11/2006 | Fujiwara et al. | |
| 2009/0170417 | A1 * | 7/2009 | Janssen | A22C 1/0023 |
| | | | | 452/136 |
| 2009/0275275 | A1 | 11/2009 | Evers | |
| 2011/0275298 | A1 * | 11/2011 | De Vos | A22C 21/003 |
| | | | | 452/136 |
| 2012/0231716 | A1 | 9/2012 | Janssen et al. | |

FOREIGN PATENT DOCUMENTS

| | | |
|---|---|---|
| JP | 2002527088 | 8/2002 |
| JP | 2010501169 | 1/2010 |
| JP | 2011125317 | 6/2011 |
| JP | 2011177096 | 9/2011 |
| JP | 2012249599 | 12/2012 |
| JP | 2013046632 | 3/2013 |
| WO | 2004052107 | 6/2004 |

OTHER PUBLICATIONS

"International Preliminary Report on Patentability" issued to PCT/JP2015/068358, issued on Jan. 3, 2017, with English translation thereof, pp. 1-17.

"International Preliminary Report on Patentability" issued to PCT/JP2015/068359, issued on January 3, 2017, with English translation thereof, pp. 1-18.

"International Preliminary Report on Patentability" issued to PCT/JP2015/068360, issued on January 3, 2017, with English translation thereof, pp. 1-16.

"International Preliminary Report on Patentability" issued to PCT/JP2015/068361, issued on January 3, 2017, with English translation thereof, pp. 1-17.

* cited by examiner

POULTRY TENDERLOIN EXTRACTION APPARATUS

CROSS-REFERENCE TO RELATED APPLICATION

This application is a 371 of international application of PCT application serial no. PCT/JP2015/068358, filed on Jun. 25, 2015, which claims the priority benefits of Japan application no. 2014-134086, filed on Jun. 30, 2014, Japan application no. 2014-134087, filed on Jun. 30, 2014, and Japan application no. 2014-134088, filed on Jun. 30, 2014. The entirety of each of the above-mentioned patent applications is hereby incorporated by reference herein and made a part of this specification.

TECHNICAL FIELD

The present invention relates to a poultry tenderloin extraction apparatus that extracts poultry tenderloin from a poultry carcass such as chicken.

BACKGROUND

In a general process of butchering a poultry carcass, such as a chicken, into a meat portion and a bone portion, butchering, deboning, and removal of guts and the like (evisceration) are performed after feather removal and blood draining. Human labor cannot efficiently perform the butchering/deboning processing for poultry carcasses, and thus has been taken over by automated processes. For many years, the present applicants have been engaged in development of automatic deboning technique for a poultry carcass. The automatic deboning processing is executed for an upper body of a poultry carcass which is eviscerated and which has the leg portions and breast meat removed. Here, the poultry carcass is fixed on a conical fixing jig known as a "cone" to be in an appropriate posture during the entire deboning processing. In the processing, the poultry carcass in this state is subjected to the deboning processing executed by a plurality of processing units.

In the butchering/deboning processing, a poultry tenderloin extraction process is performed to extract poultry tenderloin from a poultry carcass which has had its wings and breast meat removed. The present applicants have developed an automatic deboning processing apparatus for an upper body of a poultry carcass, as described in Patent Document 1. FIG. 12 in Patent Document 1 illustrates poultry tenderloin extraction processing including: making incision on a portion between poultry tenderloin and a rib portion; then clasping the tendon at the front end of the poultry tenderloin with the front end of a chuck after pushing aside a collarbone; and then pulling the chuck to scrape off the poultry tenderloin.

CITATION LIST

Patent Literature

Patent Document 1: Re-publication of PCT Internal Publication No. WO2004/052107

SUMMARY

Technical Problem

In the poultry tenderloin extraction processing in Patent Document 1, the tendon at the front end of the poultry tenderloin can be clasped by the front end of the chuck, only when the poultry carcass is stationary. This means that the conventional poultry tenderloin extraction process in Patent Document 1 can only be implemented in a state where the poultry carcass is stationary, and thus its processing performance is limited.

The clasping of the tendon at the front end of the poultry tenderloin with the chuck is a precise operation and thus its chance of succeeding is not particularly high. The chuck might even fracture bones such as a coracoid bone. When this happens, bone chips might be mixed in the poultry tenderloin.

In view of the above, an object of at least one embodiment of the present invention is to provide a poultry tenderloin extraction apparatus that can achieve high processing performance for extracting poultry tenderloin, without a risk of bone chips mixing in the poultry tenderloin.

Solution to Problem

A poultry tenderloin extraction apparatus according to at least one embodiment of the present invention is a poultry tenderloin extraction apparatus for extracting poultry tenderloin from a poultry carcass which is eviscerated and which has leg portions and breast meat removed, the poultry tenderloin extraction apparatus including: a fixing jig configured to move while holding the poultry carcass; a poultry tenderloin extraction body section disposed on each of left and right sides with respect to a conveying direction of the fixing jig; a first moving unit configured to move the poultry tenderloin extraction body section toward the fixing jig which is moved; and a second moving unit configured to move the poultry tenderloin extraction body section away from the fixing jig which is moved. The poultry tenderloin extraction body section includes a clamping device including: a clamping lower plate to be inserted under the poultry tenderloin in a longitudinal direction of the poultry tenderloin of the poultry carcass held by the fixing jig; and a clamping upper plate to be supported above the poultry tenderloin movably in an upper and lower direction, the clamping device being configured to clamp the poultry tenderloin between the clamping lower plate and the clamping upper plate when the poultry tenderloin extraction body section moves toward the fixing jig. The poultry tenderloin extraction apparatus is configured to, while the clamping device is clamping the poultry tenderloin between the clamping lower plate and the clamping upper plate, separate the poultry tenderloin from the poultry carcass by a movement of the fixing jig toward a front side in the conveying direction and a movement of the poultry tenderloin extraction body section away from the fixing jig by the second moving unit.

The poultry tenderloin extraction apparatus includes the poultry tenderloin extraction body section, the first moving unit, and the second moving unit. The poultry tenderloin extraction body section includes the clamping device which includes the clamping lower plate and the clamping upper plate and clamps the poultry tenderloin. Thus, the poultry tenderloin can be removed from the poultry carcass through the movement of the cone toward the front in the conveying direction, and the movement of the poultry tenderloin extraction body section away from the cone by the second moving unit, while the poultry tenderloin is being clamped by the clamping lower plate and the clamping upper plate of the clamping device. All things considered, the poultry tenderloin can be extracted with the fixing jig, holding the poultry carcass, keeps moving instead of stopping when the poultry tenderloin is extracted, whereby higher processing performance for extracting the poultry tenderloin can be achieved.

The poultry tenderloin is extracted through clamping by the clamping lower plate and the clamping upper plate in pair, which is close to an extraction operation performed by human labor, and thus can be certainly extracted without being damaged. Thus, the poultry tenderloin is more likely to be successfully extracted. The clamping lower plate of the clamping device is inserted below the poultry tenderloin in the width direction relative to the longitudinal direction of the poultry tenderloin, and the clamping upper plate of the clamping device disposed above the poultry tenderloin moves downward toward the clamping lower plate, so that the poultry tenderloin is clamped between the clamping lower plate and the upper side of the clamping upper plate. All things considered, bones around the poultry tenderloin are less likely to be fractured, whereby bone chips are prevented from mixing in the poultry tenderloin.

In some embodiments, the clamping upper plate of the clamping device is disposed above and facing the clamping lower plate and is supported via an opening/closing mechanism unit configured to move the clamping upper plate toward and away from the clamping lower plate.

In this configuration, the clamping upper plate of the clamping device is disposed above and facing the clamping lower plate, and is moved toward and away from the clamping lower plate by the opening/closing mechanism unit. Thus, the poultry tenderloin can be clamped from the upper and the lower sides by the clamping upper plate and the clamping lower plate. Thus, the poultry tenderloin can be substantially entirely clamped, and thus can be more certainly extracted without being damaged.

In some embodiments, the first moving unit is provided to the poultry tenderloin extraction body section in such a manner that a distal end portion of the clamping device is oriented in a width direction relative to the longitudinal direction of the poultry tenderloin of the poultry carcass held by the fixing jig.

In this configuration, the first moving unit is provided to the poultry tenderloin extraction body section in such a manner that the distal end portion of the clamping device is oriented in the width direction relative to the longitudinal direction of the poultry tenderloin of the poultry carcass held by the fixing jig. Thus, when the clamping lower plate of the clamping device is inserted below the poultry tenderloin, the distal end portion of the clamping lower plate can be entirely inserted at once. Thus, the poultry tenderloin can be certainly held in the entire longitudinal direction by the clamping lower plate and the clamping upper plate.

In some embodiments, the second moving unit is configured to move the poultry tenderloin extraction body section away from the fixing jig while a distal end portion of the clamping device is oriented in a width direction relative to the longitudinal direction of the poultry tenderloin of the poultry carcass held by the fixing jig.

In this configuration, the second moving unit is configured to move the poultry tenderloin extraction body section away from the fixing jig while the distal end portion of the clamping device is oriented in the width direction relative to the longitudinal direction of the poultry tenderloin of the poultry carcass held by the fixing jig. Thus, the poultry tenderloin can be quickly extracted from the poultry carcass, whereby higher processing performance for extracting the poultry tenderloin can be achieved.

In some embodiments, the first moving unit is configured to move the poultry tenderloin extraction body section toward the fixing jig in a direction inclined at an acute angle to the conveying direction of the fixing jig in plan view.

In this configuration, the first moving unit is configured to move the poultry tenderloin extraction body section toward the fixing jig in a direction inclined at an acute angle to the conveying direction of the fixing jig in plan view. Thus, when the poultry tenderloin extraction body section is retracted with the clamping device clamping the poultry tenderloin, the poultry tenderloin extraction body section moves rearward in the conveying direction of the fixing jig, and outward in the width direction to move away from the fixing jig. Thus, the poultry tenderloin of the poultry carcass held by the fixing jig can be pulled away from the poultry carcass, whereby the poultry tenderloin can be extracted in a manner close to that by human labor. All things considered, the poultry tenderloin can be more certainly extracted without being damaged.

In some embodiments, the clamping lower plate of the clamping device is supported pivotally in the upper and lower direction about a fulcrum at the poultry tenderloin extraction body section and is connected to the retracting mechanism unit configured to permit the clamping lower plate to pivot about the fulcrum and to retract, when the clamping lower plate receives counter force involving an upper direction component while being in contact with the poultry carcass held by the fixing jig which is moved.

In this configuration, the clamping lower plate of the clamping device is supported pivotally in the upper and lower direction about a fulcrum at the poultry tenderloin extraction body section and is connected to the retracting mechanism unit configured to permit the clamping lower plate to pivot about the fulcrum and to retract, when the clamping lower plate receives counter force involving an upper direction component while being in contact with the poultry carcass held by the fixing jig which is moved. Thus, the poultry carcass can be prevented from receiving a large amount of force from the clamping device, and thus can be prevented from being damaged.

In some embodiments, the poultry tenderloin extraction apparatus further includes a poultry tenderloin separation unit disposed on a retraction path in which the clamping device having the poultry tenderloin clamped therein moves away from the fixing jig, and configured to, when the clamping device is in a retracting movement, separate the poultry tenderloin from the clamping device by biasing the poultry tenderloin placed on the clamping lower plate while the clamping device is in a state where the clamping upper plate is open with respect to the clamping lower plate.

In this configuration, the poultry tenderloin separation unit is disposed on the retraction path in which the clamping device having the poultry tenderloin clamped therein moves away from the fixing jig, and configured to, when the clamping device is in a retracting movement, separate the poultry tenderloin from the clamping device by biasing the poultry tenderloin placed on the clamping lower plate while the clamping device is in a state where the clamping upper plate is open with respect to the clamping lower plate. Thus, the extracted poultry tenderloin can easily be discharged from the clamping device, whereby even higher processing performance can be achieved for the operation of separating the poultry tenderloin.

Advantageous Effects

At least some embodiments of the present invention can provide a poultry tenderloin extraction apparatus that can achieve higher processing performance for extracting poultry tenderloin, without a risk of bone chips mixing in the poultry tenderloin.

DETAILED DESCRIPTION

Poultry tenderloin holding devices according to embodiments of the present invention are described below with reference to FIGS. 1 to 14. There is no intension to limit the scope of the present invention to sizes, materials, shapes, positional relationships, and the like of components described in the embodiments, unless otherwise specified.

Figure 1:
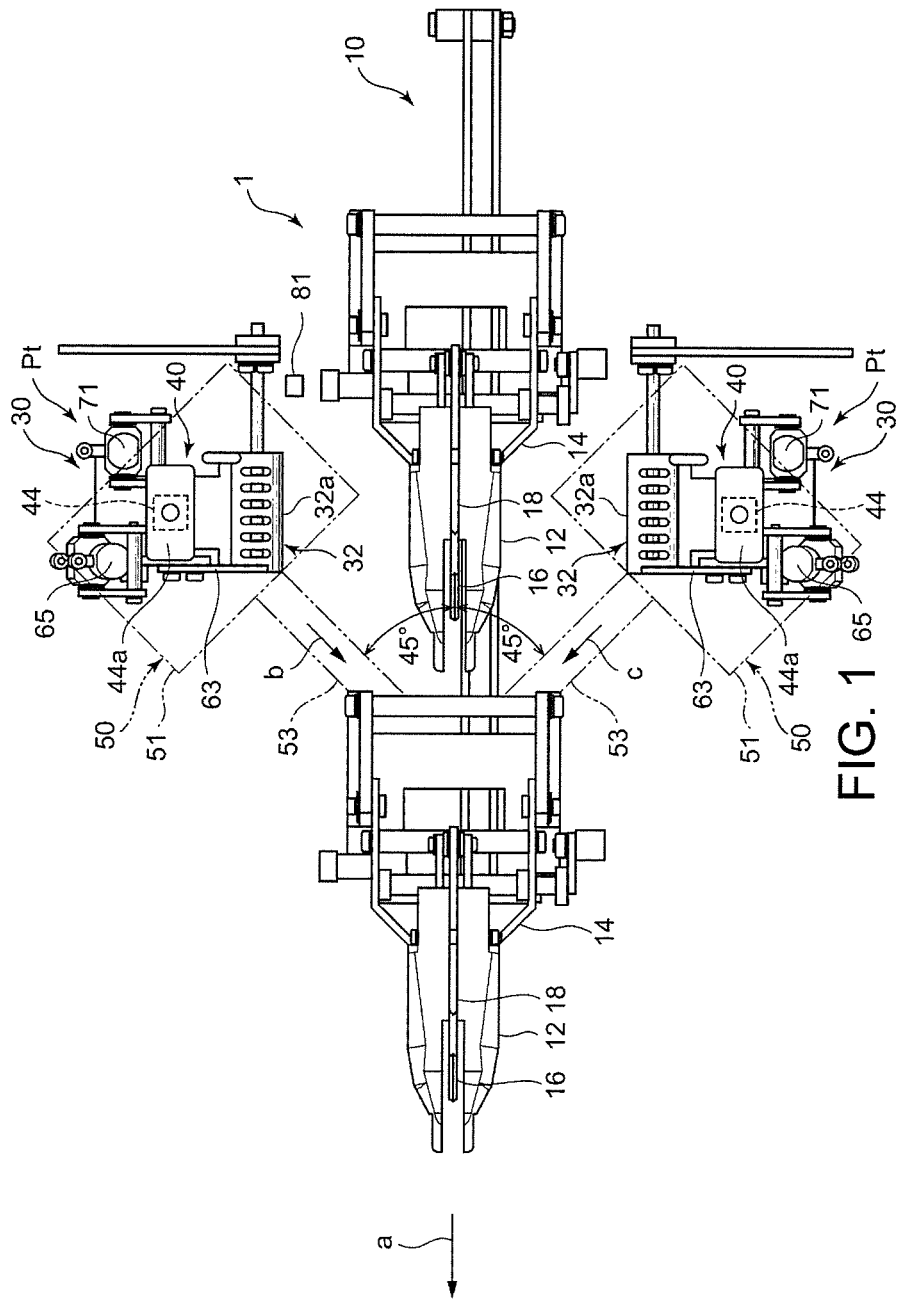
FIG. 1 is a partial plan view of a poultry tenderloin extraction apparatus and a conveying device that conveys a poultry carcass, according to one embodiment of the present invention.
Figure 2:
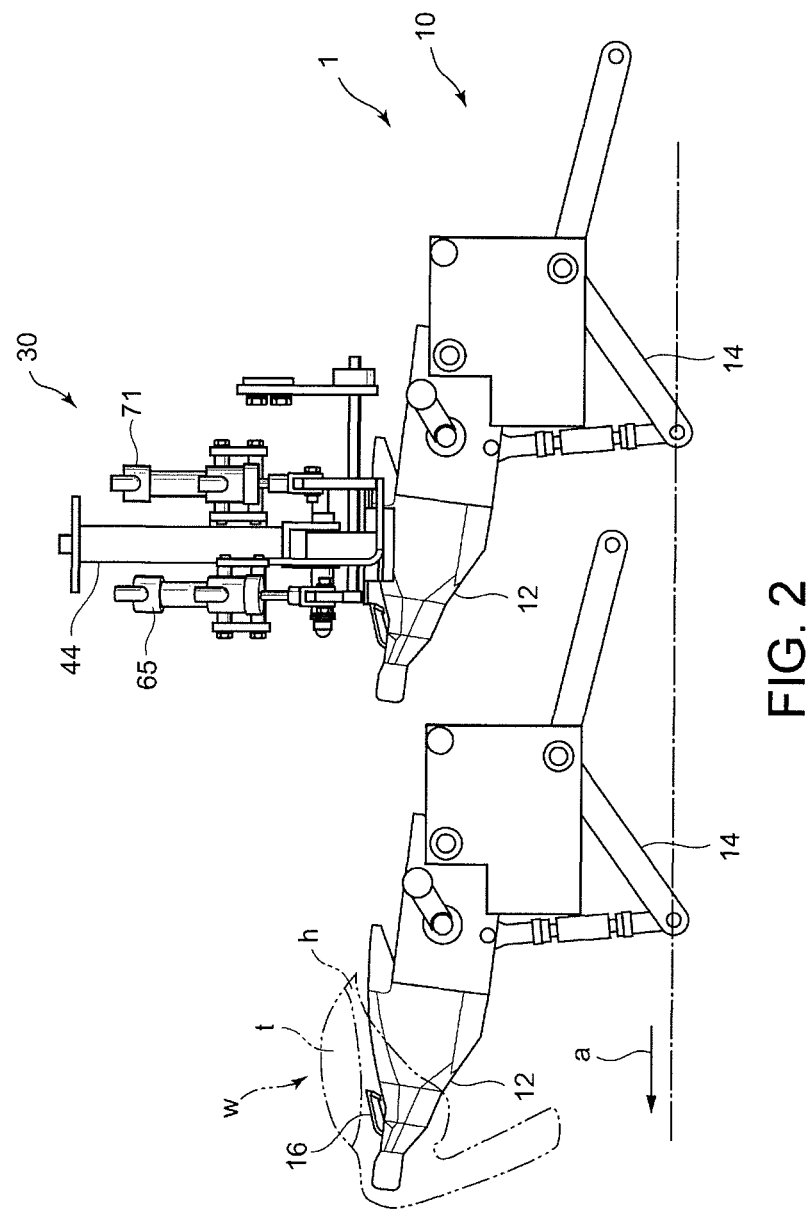
FIG. 2 is a partial front view of the poultry tenderloin extraction apparatus and the conveying device that conveys a poultry carcass, according to one embodiment of the present invention.

A conveying device that conveys a poultry carcass is described before a poultry tenderloin extraction apparatus according to one embodiment of the present invention is described. FIG. 1 is a partial plan view of a poultry tenderloin extraction apparatus 30 and a conveying device 1, in a state where the poultry tenderloin extraction apparatus 30 is at a position separated from a cone 12 (hereinafter, referred to as a "poultry tenderloin retraction position Pt"). FIG. 2 is a partial front view of the poultry tenderloin extraction apparatus 30 and the conveying device 1 in the state where the poultry tenderloin extraction apparatus 30 is at the poultry tenderloin retraction position Pt.

As illustrated in FIG. 1 (partial plan view) and FIG. 2 (partial front view), the conveying device 1 includes a chain conveyer 10 that moves in a direction indicated by an arrow a at constant speed. The chain conveyer 10 is provided with a plurality of the cones 12 (fixing jigs), each having a conical shape, arranged at an equal interval along its conveying direction. Each link mechanism 14 enables a corresponding one of the cones 12 to be inclined forward or backward, in the conveying direction, by any angle. A poultry carcass which is eviscerated and which has the leg portions and breast meat removed is placed on one of the cones 12 that is positioned at a front end portion (not illustrated) of the chain conveyer 10.

Each of the cones 12 is provided with a hook 16 that can be moved between cone tip and base end sides via a link mechanism 18. The poultry carcass, placed on the cone 12, has the center of its breastbone hooked by the hook 16, and thus is fixed to the cone 12. The poultry carcass, placed and fixed on the corresponding one of the plurality of cones 12, is conveyed while facing the chain conveyer 10, to be subjected to disassembling/deboning processing executed by a plurality of processing units arranged in series along the chain conveyer 10. The poultry carcass, fixed to the cone 12, is first subjected to a process of separating breast meat with wings from the poultry carcass. When this process of separating the breast meat with wings is executed, the poultry carcass rib cage from which the breast meat with wings has been removed (hereinafter, referred to as a "workpiece W") remains on the cone 12.

After the process of separating the breast meat with wings, a poultry tenderloin lateral incision process is performed on the workpiece W, so that poultry tenderloin t is separated from a rib h through incision. In the poultry tenderloin lateral incision process, the cone 12 is inclined by a certain angle so as to extend substantially horizontally toward the front side in the conveying direction. In this state, a pair of cutting blades (not illustrated) is inserted between the rib h having a breast side portion facing upward and two pieces of poultry tenderloin t of the workpiece W arranged side by side on the ribs h, whereby the poultry tenderloin t is separated from the ribs h.

When the poultry tenderloin t is separated from the rib h, a breast gristle separating process is performed. In the breast gristle separating process, a pair of scrapers is inserted between both sides of a breast gristle at the center of the rib h and the poultry tenderloin t, so that the poultry tenderloin t is separated from the breast gristle. Then, a poultry tenderloin longitudinal cutting process is performed so that the poultry tenderloin t is separated from a collar bone. When the poultry tenderloin t is separated from the collar bone, a poultry tenderloin extraction process of extracting the poultry tenderloin t from the workpiece W is performed. In the poultry tenderloin extraction process, the poultry tenderloin t is extracted by the poultry tenderloin extraction apparatus 30.

Figure 3:
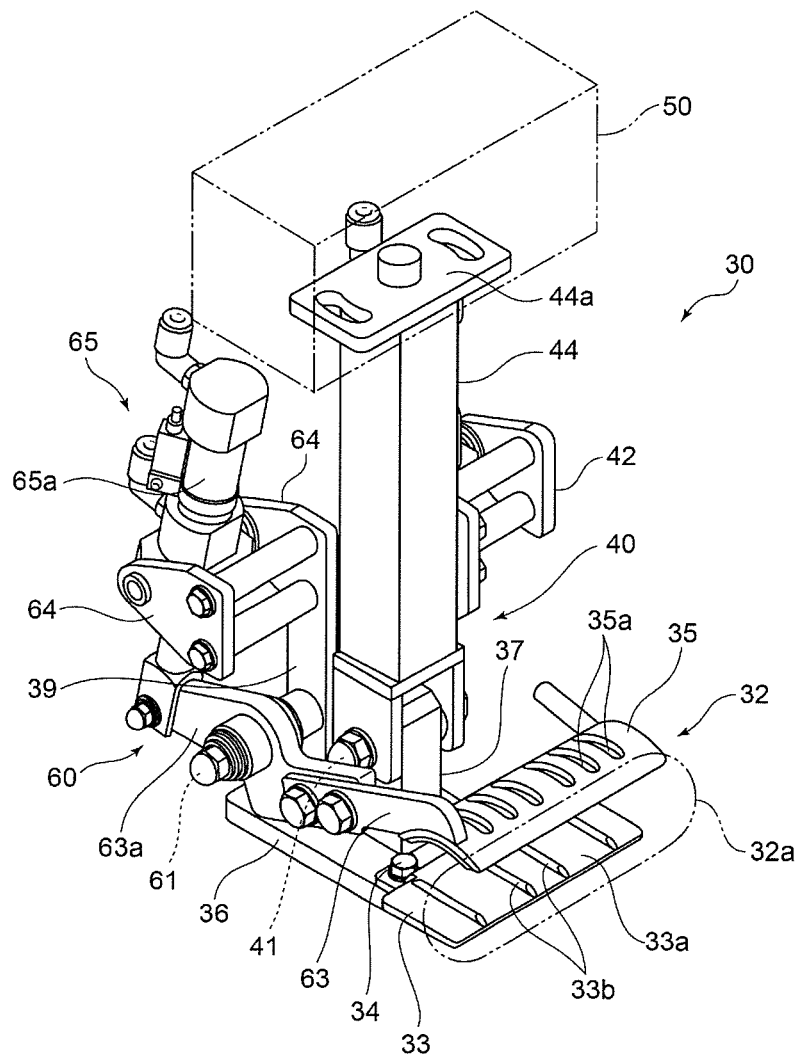
FIG. 3 is a left perspective view of the poultry tenderloin extraction apparatus according to one embodiment of the present invention.
Figure 4:
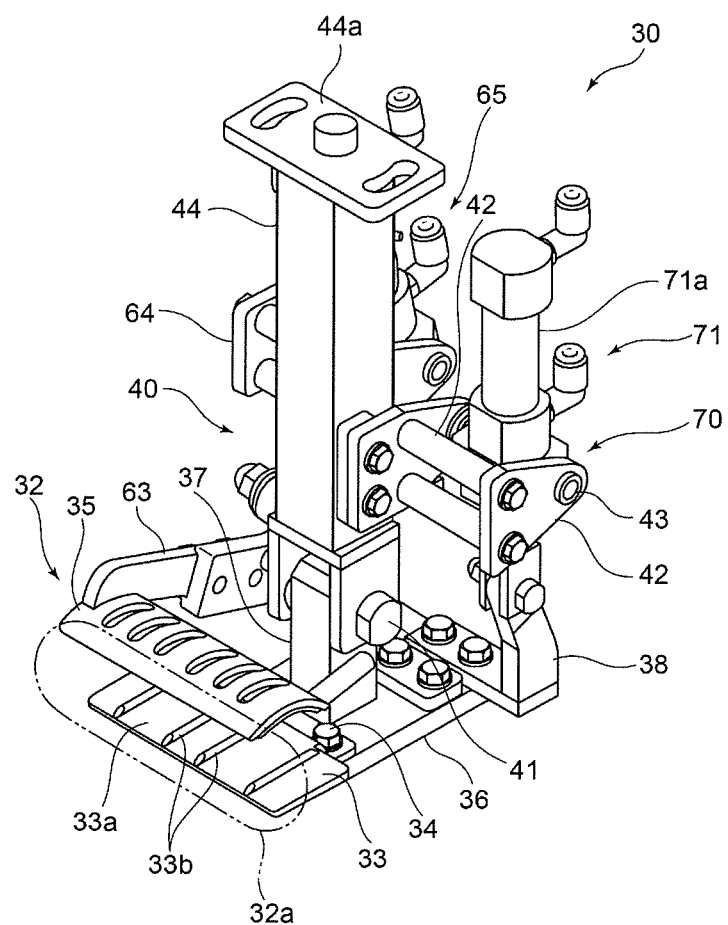
FIG. 4 is a right perspective view of the poultry tenderloin extraction apparatus according to one embodiment of the present invention.
Figure 5:
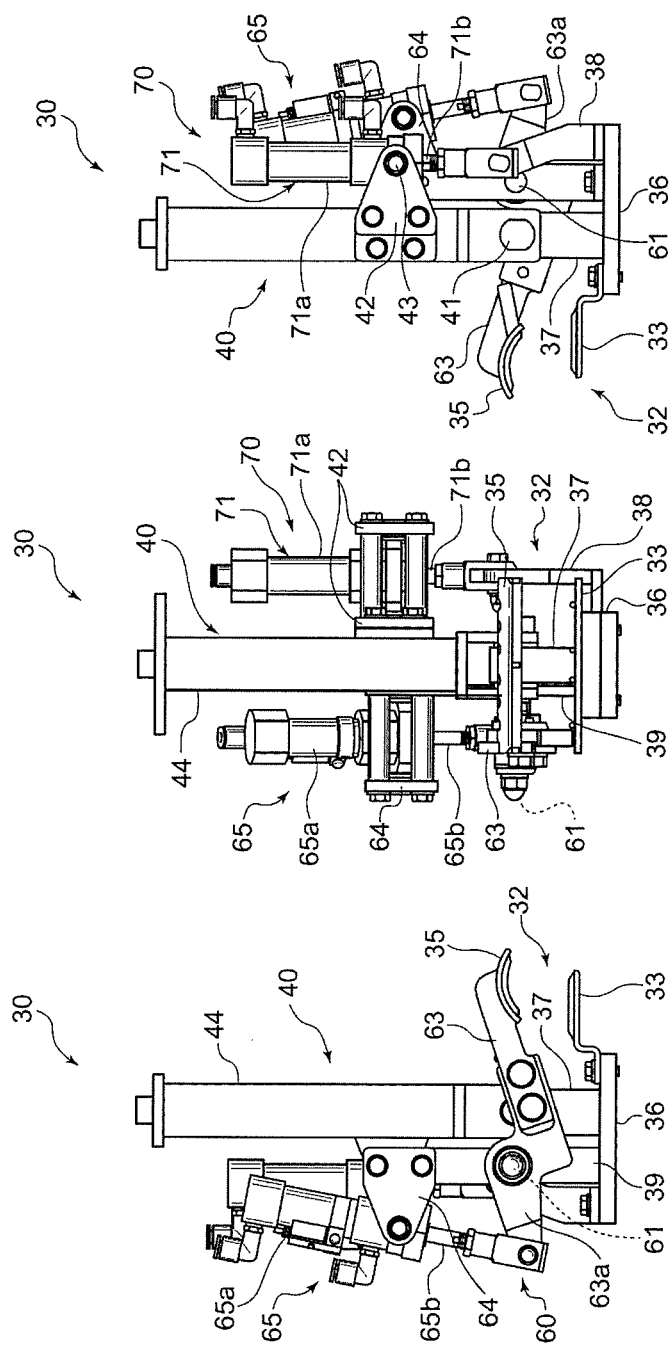
FIG. 5(a) is a front view of the poultry tenderloin extraction apparatus.
FIG. 5(b) is a right side view of the poultry tenderloin extraction apparatus.
FIG. 5(c) is a left side view of the poultry tenderloin extraction apparatus.

Next, the poultry tenderloin extraction apparatus 30 will be described with reference to FIGS. 1, 3, 4, and 5(a)-5(c). FIG. 3 is a left perspective view of the poultry tenderloin extraction apparatus as viewed diagonally from the left side. FIG. 4 is a right perspective view of the poultry tenderloin extraction apparatus as viewed diagonally from the right side. FIG. 5(a) is a front view of the poultry tenderloin extraction apparatus. FIG. 5(b) is a right side view of the poultry tenderloin extraction apparatus. FIG. 5(c) is a left side view of the poultry tenderloin extraction apparatus. As illustrated in FIG. 1, the poultry tenderloin extraction apparatus 30 is disposed on each of left and right sides of the conveying direction of the cone 12 being moved.

As illustrated in FIG. 1, FIG. 3 (left perspective view), and FIG. 4 (right perspective view), the poultry tenderloin extraction apparatus 30 includes: a clamping device 32 for clamping the poultry tenderloin t; a moving unit 40 attached to the clamping device 32; a movement mechanism unit 50 that moves the moving unit 40 toward and away from the cone 12, with a distal end portion 32a of the clamping device 32 being oriented in a width direction of the cone 12 that is moving; an opening/closing mechanism unit 60 that opens/closes the clamping device 32; a retracting mechanism unit 70 that makes the clamping device 32 retracted upward when the clamping device 32 receives counter force including an upward component from the workpiece W from which the poultry tenderloin is extracted; and a control device 80 (see FIG. 6) that controls operations of the movement mechanism unit 50 and the opening/closing mechanism unit 60 in such a manner that the moving unit 40 is moved toward the cone 12 being moved and is retracted from the cone 12 when the poultry tenderloin t is clamped by the clamping device 32 so that the poultry tenderloin t is extracted.

The clamping device 32 includes: a clamping lower plate 33 that is supported in such a manner as to be able to pivot in an upper and lower direction about a shaft 41, horizontally disposed at a lower portion of the moving unit 40; and a clamping upper plate 35 that is disposed above and facing the clamping lower plate 33 and can be moved toward and away from the clamping lower plate 33. The clamping lower plate 33 has a rectangular shape in a plan view, and has a longitudinal direction extending in an advancing direction of the cone 12. The clamping lower plate 33 has an upper surface 33a provided with a plurality of protrusions 33b that are arranged at a predetermined interval in the longitudinal direction and extend in a shorthand direction. With the protrusions 33b, a small contact area between the clamping lower plate 33 and the poultry tenderloin t placed thereon is achieved, so that the poultry tenderloin t is less likely to stick on the clamping lower plate 33.

A coupling plate 36 is attached to another end portion of the clamping lower plate 33 in the shorthand direction with a bolt 34. A protrusion 37 that protrudes upward is provided at a center portion of an upper surface of the coupling plate 36. The protrusion 37 has an upper portion rotatably supported by the shaft 41 provided to the moving unit 40. Thus, the clamping lower plate 33 can pivot in the upper and lower direction about the shaft 41. The clamping lower plate 33 has the other end portion in the shorthand direction connected to the retracting mechanism unit 70.

As illustrated in FIG. 4, FIG. 5(a) (front view), and FIG. 5(b) (right side view), the retracting mechanism unit 70 includes a retraction cylinder 71 that holds the clamping lower plate 33 to be in a horizontal direction in a normal state, and causes the clamping lower plate 33 to pivot upward to be retracted when the clamping lower plate 33 receives force (counterforce) including the upward component upon coming into contact with the workpiece W (poultry carcass rib cage) supported by the cone 12. The retraction cylinder 71 is supported via a pair of brackets 42 attached to the moving unit 40 with a rod side end portion directed downward. The retraction cylinder 71 includes: a cylinder tube 71a rotatably supported by a shaft 43 disposed between the pair of brackets 42; and a cylinder rod 71b having a distal end portion rotatably connected to an upper end portion of a protruding plate 38 protruding from the other end side of the coupling plate 36. The retraction cylinder 71, which is a double-acting air cylinder, can be expanded and compressed through control of supplying and discharging air pressure performed with a direction switching valve 72 (see FIG. 6).

The retraction cylinder 71 is disposed to hold the clamping lower plate 33 in the horizontal direction, while being in a fully compressed state. Thus, when the force including the upward component acts on the clamping lower plate 33 held in the horizontal direction by the retraction cylinder 71, the retraction cylinder 71 expands with the coupling plate 36 and the protruding plate 38 pivoting in a clockwise direction about the shaft 41. The air in a rod side chamber of the retraction cylinder 71 is compressed when the cylinder rod 71b expands, so that the retraction cylinder 71 can be expanded. As a result, the clamping lower plate 33 pivots upward about the shaft 41. At the same time, the clamping upper plate 35 described later also pivots upward about the shaft 41. Thus, the workpiece W can be prevented from receiving an excessive amount of force.

As illustrated in FIG. 3 and FIG. 5(c) (left side view), the clamping upper plate 35 faces the upper surface 33a of the clamping lower plate 33, has a rectangular shape in plan view, and has an upward convex shape in side view. The clamping upper plate 35 is provided with a plurality of long holes 35a that are arranged at a predetermined interval in the longitudinal direction and extend in the shorthand direction. The poultry tenderloin t, clamped by the clamping upper plate 35 and the clamping lower plate 33, is caught by the long holes 35a, and thus is less likely to fall off from the clamping device 32.

The clamping upper plate 35 is fixed to a distal end portion of an arm 63 that is supported as to be able to pivot in the upper and lower direction about a shaft 61 provided at an intermediate portion of a supporting plate 39 in the upper and lower direction, with this supporting plate 39 protruding upward from an end portion of the coupling plate 36. The arm 63 is provided with a coupling arm 63a extending toward a side opposite to the distal end portion, from the shaft 61. The supporting plate 39 has an upper portion rotatably supporting a cylinder tube 65a of an opening/closing cylinder 65 having a rod side end portion directed downward, via a pair of brackets 64. A cylinder rod 65b of the opening/closing cylinder 65 has a distal end portion rotatably connected to the distal end portion of the coupling arm 63a. The opening/closing cylinder 65, which is a double-acting air cylinder, can be expanded and compressed through control of supplying and discharging air pressure performed with a direction switching valve 66 (see FIG. 6). The direction switching valve 66 is an electromagnetic direction switching valve, operation of which is controlled by the control device 80 described later.

When the opening/closing cylinder 65 is expanded, the arm 63 pivots about the shaft 61 in the upper and lower direction, whereby the clamping device 32 can be opened/closed with the clamping upper plate 35 moving toward and away from the clamping lower plate 33. Thus, the arm 63 and the opening/closing cylinder 65 form the opening/closing mechanism unit 60 that can open/close the clamping device 32 with the clamping upper plate 35 moving toward and away from the clamping lower plate 33. Thus, the clamping device 32 can elastically clamp the poultry tenderloin t of the workpiece W with elastic force of compressed air of the opening/closing cylinder 65.

The moving unit 40 includes a pillar 44 extending in the upper and lower direction. The pillar 44 has a rectangular column shape and includes: the shaft 41, at a lower end portion, rotatably supporting the coupling plate 36; and a flange 44a, at an upper end portion, expanding outward. The flange 44a is connected to the movement mechanism unit 50 (see FIG. 3) that moves the moving unit 40 toward and away from the cone 12.

As illustrated in FIG. 1, the movement mechanism unit 50 includes: a motor casing 51 that is fixed to the flange 44a provided to the upper portion of the pillar 44; a servo motor 52 (see FIG. 6) incorporated in the motor casing 51; and a ball screw 53 coupled to an output shaft of the servo motor 52. The ball screw 53 is inclined by an acute angle (45° in the figure) with respect to the conveying direction of the cone 12 of the chain conveyor 10. The servo motors 52 operate in such a manner that the two poultry tenderloin extraction apparatuses 30 move in direction indicated by arrows b and c, in synchronization with the movement of the cone 12 indicated by the arrow a, to reach poultry tenderloin holding positions Ps illustrated in FIG. 7. The poultry tenderloin extraction apparatuses 30 that have reached the poultry tenderloin holding positions Ps each hold the poultry tenderloin t with the clamping device 32, and then move back to their original positions, that is, the poultry tenderloin retraction positions Pt through the operation of the servo motor 52.

Figure 6:
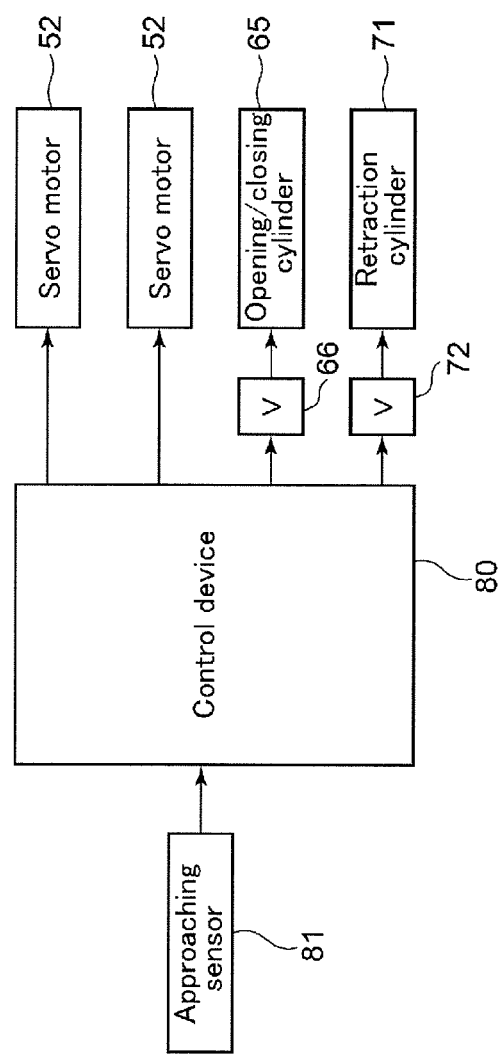
FIG. 6 is a block diagram of a control device that controls an operation performed by the poultry tenderloin extraction apparatus according to one embodiment of the present invention.

Next, the control device 80 is described with reference to FIG. 1 and FIG. 6 to FIG. 12. As illustrated in FIG. 6, the control device 80 is electrically connected to an approaching sensor 81, the servo motors 52 of the movement mechanism units 50, the direction switching valve 66, and the direction switching valve 72. The approaching sensor 81 detects that the cone 12 has moved to a predetermined position in front of the poultry tenderloin holding position Ps. The direction switching valve 66 performs the control of suppling/discharging air to and from the opening/closing cylinder 65. The direction switching valve 72 performs the control of suppling/discharging air to and from the retraction cylinder 71.

Figure 7:
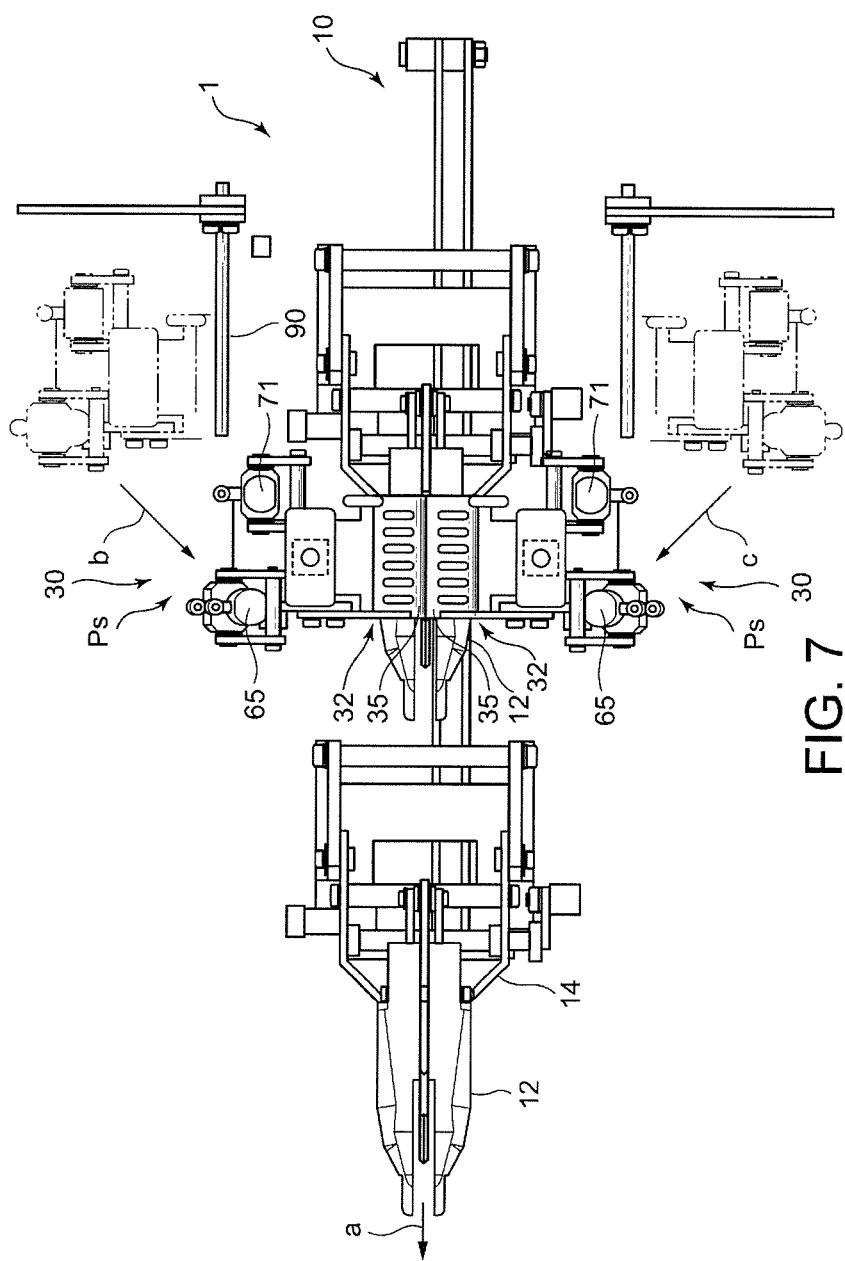
FIG. 7 is a plan view of a poultry tenderloin holding device and a cone in a state where the poultry tenderloin holding device has moved to a poultry tenderloin holding position close to the cone.

As illustrated in FIG. 1, the approaching sensor 81 is disposed at a position facing a path of the chain conveyor 10. In the present embodiment, the approaching sensor 81 is disposed on the right side of the path of the chain conveyor 10. The position of the approaching sensor 81 is set on the basis of conveyance speed of the cone 12, speed of the poultry tenderloin extraction apparatus 30 approaching the cone 12, the poultry tenderloin retraction position Pt and the poultry tenderloin holding position Ps of the poultry tenderloin extraction apparatus 30, and the like. The approaching sensor 81 may be disposed on the left side of the path of the chain conveyor 10. Upon detecting the cone 12, the approaching sensor 81 transmits a detection signal to the control device 80 (see FIG. 6), and thus the control device 80 drives the servo motor 52. As illustrated in FIG. 7 (plan view), when the servo motors 52 are driven, the poultry tenderloin extraction apparatuses 30 move toward the cone 12 to the poultry tenderloin holding positions Ps, in synchronization with the movement of the cone 12, while being inclined by 45° with respect to the conveying direction of the cone 12. When the poultry tenderloin extraction apparatus 30 starts to move to the poultry tenderloin holding position Ps, the control device 80 expands the opening/closing cylinder 65 via the direction switching valve 66 so that the clamping device 32 opens.

Figure 8:
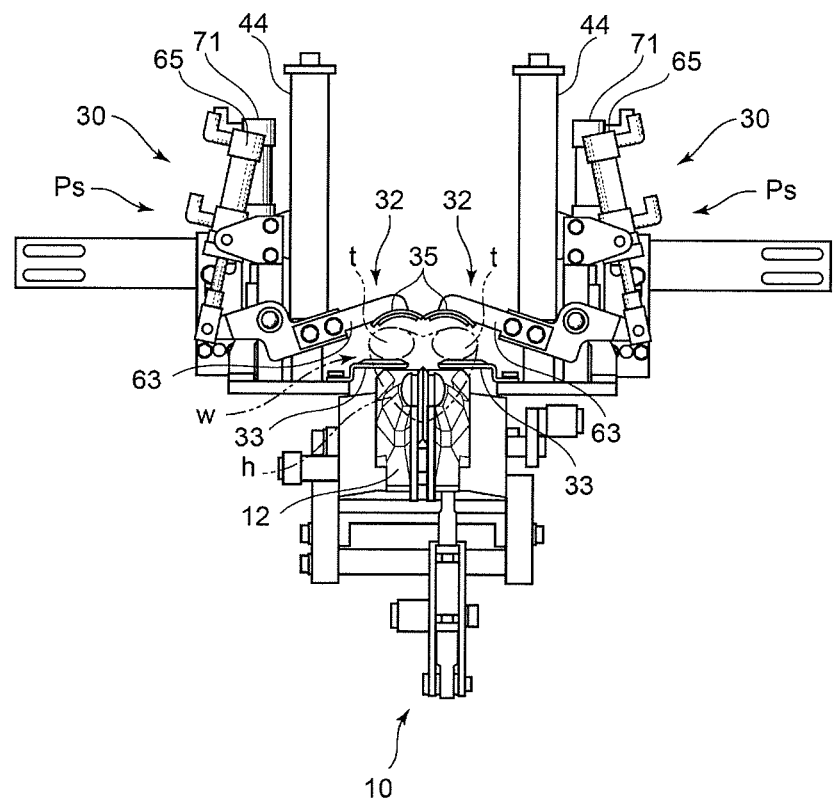
FIG. 8 is a front side view of the poultry tenderloin holding device and a cone in the state where the poultry tenderloin holding device has moved to the poultry tenderloin holding position.
Figure 9:
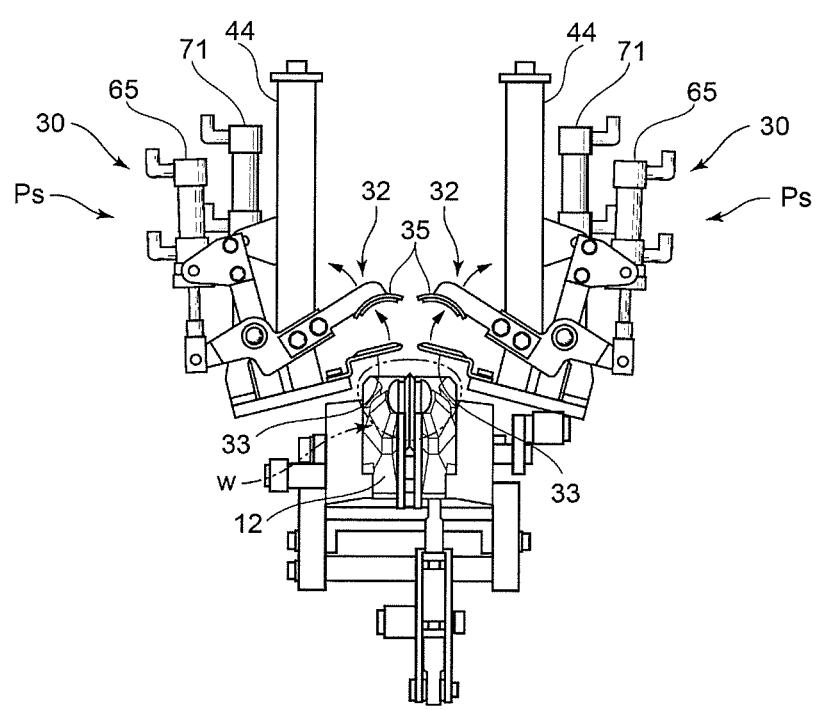
FIG. 9 is a front side view of the poultry tenderloin holding device illustrating a retracting movement of the clamping device performed when a lower clamping plate comes into contact with a poultry carcass, held by the cone, and thus receives counter force.

When the poultry tenderloin extraction apparatus 30 reaches the poultry tenderloin holding position Ps, as illustrated in FIG. 8 (front side view), the clamping lower plate 33 of the clamping device 32 of each of the two poultry tenderloin extraction apparatuses 30, disposed on the left and right sides, is inserted between the rib h and a corresponding one of the two pieces of poultry tenderloin t of the workpiece W with the clamping upper plate 35 disposed above the poultry tenderloin t. As illustrated in FIG. 9 (front side view), when the poultry tenderloin extraction apparatus 30 reaches the poultry tenderloin holding position Ps, the clamping lower plate 33 that has come into contact with the workpiece W and receives large counterforce including the upward component from the workpiece W can make the clamping device 32 pivot about the shaft 41 as a fulcrum upward to be retracted from the workpiece W due to a cushioning effect of the retraction cylinder 71. Thus, the workpiece W can be prevented from being damaged.

Figure 10:
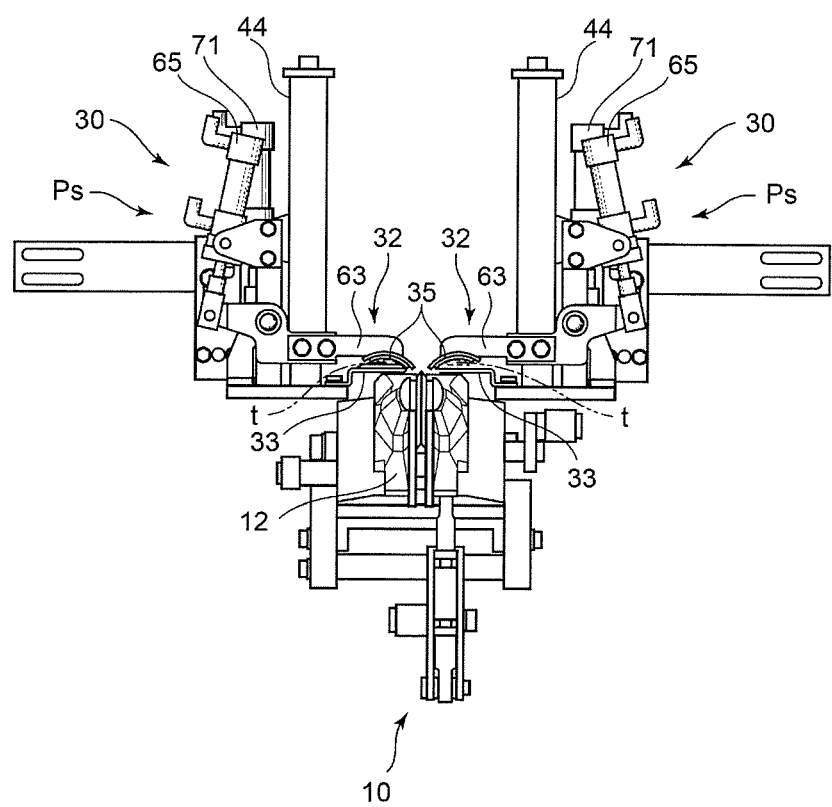
FIG. 10 is a front side view of the poultry tenderloin holding device in a state where the poultry tenderloin holding device has moved to the poultry tenderloin holding position and the clamping device has closed.

When the poultry tenderloin extraction apparatus 30 moves to the poultry tenderloin holding position Ps and the clamping lower plate 33 is inserted between the rib h and the poultry tenderloin t, the control device 80 controls an operation of the direction switching valve 66 connected to the opening/closing cylinder 65 so that the opening/closing cylinder 65 is compressed, as illustrated in FIG. 10 (front side view). Thus, the clamping upper plate 35 of the clamping device 32 pivots downward, whereby the poultry tenderloin t is held by the clamping lower plate 33 and the clamping upper plate 35.

Figure 11:
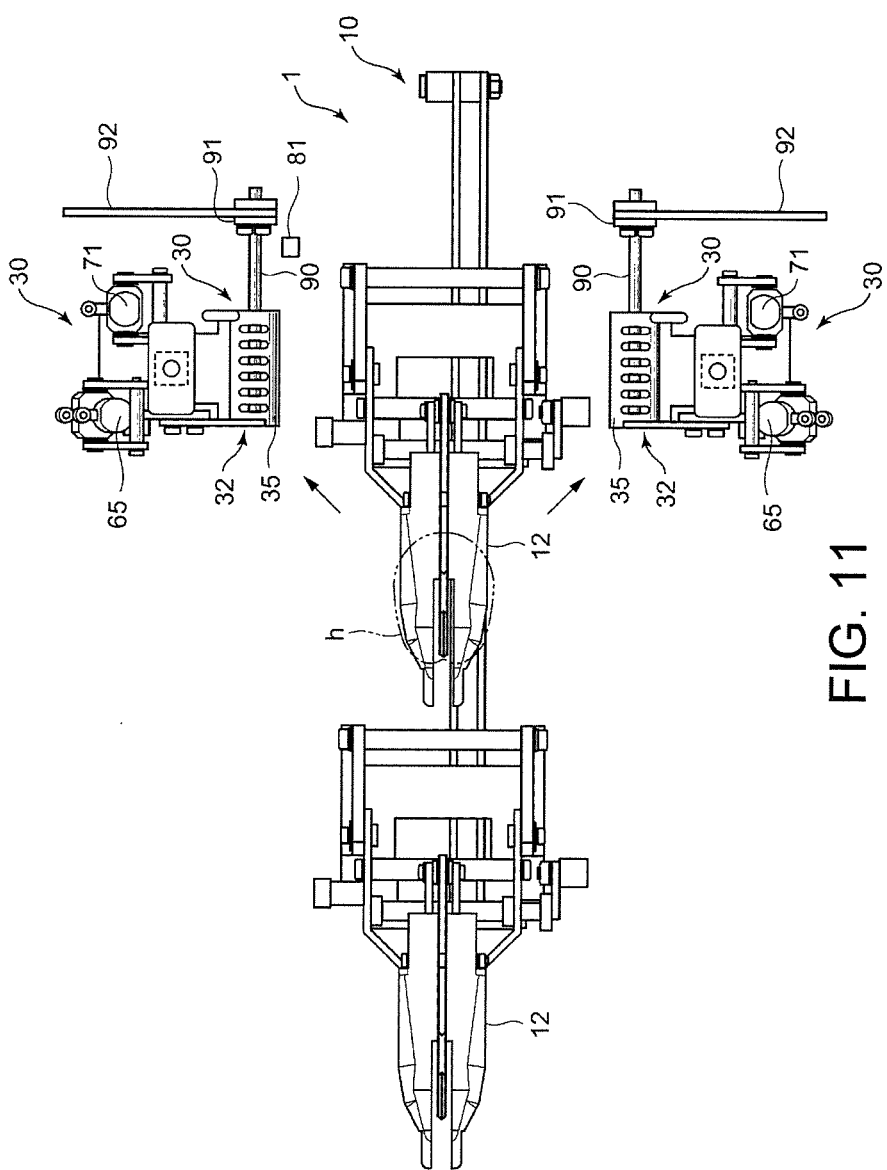
FIG. 11 is a plan view of the poultry tenderloin holding device that has moved to a poultry tenderloin retraction position.

When the poultry tenderloin t is held by the clamping lower plate 33 and the clamping upper plate 35, as illustrated in FIG. 6 and FIG. 11 (plan view), the control device 80 drives the servo motor 52 in such a manner that the poultry tenderloin extraction apparatus 30 is retracted from the poultry tenderloin holding position Ps. When the poultry tenderloin extraction apparatus 30 is thus retracted, the poultry tenderloin t is separated from the rib h, in synchronization with the conveyance of the cone 12. Then, when the poultry tenderloin extraction apparatus 30 is retracted, the direction switching valve 66 of the opening/closing cylinder 65 is controlled in such a manner that the opening/closing cylinder 65 expands so that the clamping device 32 opens (see FIG. 12). As a result, the poultry tenderloin t, no longer in the state of being clamped by the clamping device 32, is placed on the clamping lower plate 33 and comes into contact with a poultry tenderloin detachment bar 90, disposed on the retraction path, to drop from the clamping lower plate 33 when the poultry tenderloin extraction apparatus 30 approaches the poultry tenderloin retraction position Pt.

Figure 12:
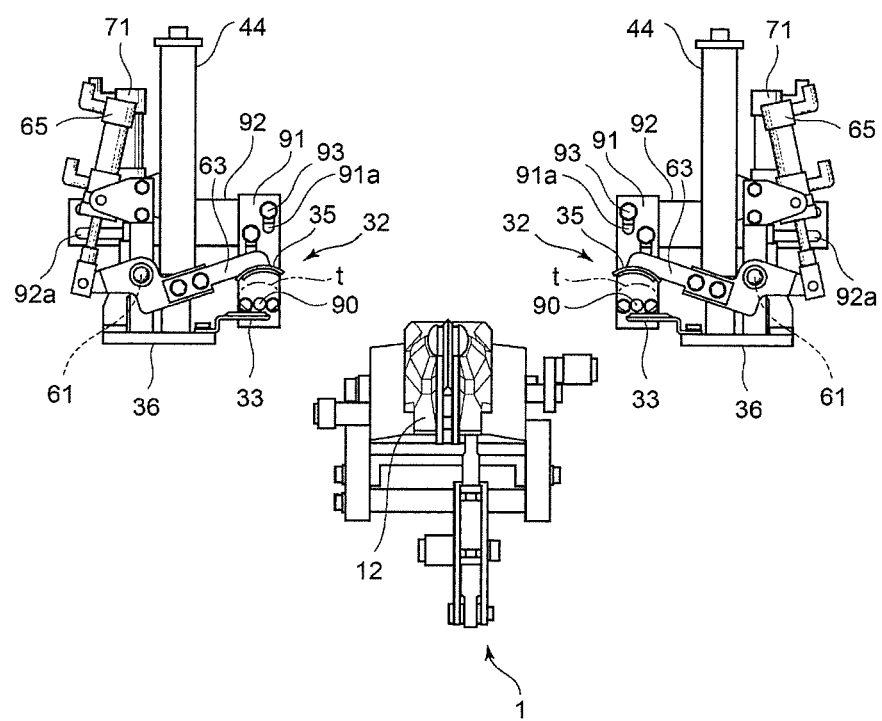
FIG. 12 is a front side view of the poultry tenderloin holding device in a state where the poultry tenderloin holding device has moved to the poultry tenderloin retraction position and the clamping device is open.

As illustrated in FIGS. 11 and 12, the poultry tenderloin detachment bar 90 can be inserted between the clamping lower plate 33 and the clamping upper plate 35 of the clamping device 32 at the poultry tenderloin retraction position Pt, and is disposed above the upper surface 33a of the clamping lower plate 33. The poultry tenderloin detachment bar 90 is coupled to a supporting plate 91 that is disposed in the upper and lower direction and is coupled to a coupling plate 92 arranged in a left and right direction with a bolt 93. The bolt 93 is inserted in a long hole 91a, formed on the supporting plate 91. Thus, the position of the poultry tenderloin detachment bar 90 in the upper and lower direction can be adjusted by adjusting the fastened position of the bolt 93 relative to the long hole 91a.

The coupling plate 92 is fixed to a fix portion (not illustrated) with a bolt (not illustrated). The bolt is inserted in the long hole 92a, formed in the coupling plate 92, so that the position of the poultry tenderloin detachment bar 90 in the left and right direction can also be adjusted.

In the present embodiment described above, the poultry tenderloin extraction apparatus 30 includes the clamping device 32, including the clamping lower plate 33 and the clamping upper plate 35 that can clamp the poultry tenderloin t in the upper and lower direction, and thus extracts the poultry tenderloin t in a manner close to that by the human labor. Thus, the poultry tenderloin t is certainly extracted without being damaged, and the poultry tenderloin t is more likely to be successfully grabbed. When the workpiece W held by the cone 12 is being conveyed, the extraction of the poultry tenderloin t can be guaranteed with the poultry tenderloin extraction apparatus 30 synchronized with the movement of the cone 12. Thus, the poultry tenderloin t can be successively extracted from many workpieces W, whereby high processing performance can be achieved.

The clamping device 32 is provided with the retraction cylinder 71, and thus does not apply excessive force on the workpiece W. This ensures that bones around the poultry tenderloin is not fractured to be mixed in the poultry tenderloin t extracted.

The retraction path of the clamping device 32 is provided with the poultry tenderloin detachment bar 90 so that the poultry tenderloin t can be easily separated from the clamping device 32, whereby even higher work efficiency can be achieved.

The upper surface 33a of the clamping lower plate 33 is provided with the protrusions 33b so that the poultry tenderloin t is less likely to be stuck on the clamping lower plate 33 and thus can be easily detached from the clamping device 32.

In the embodiment described above, the retraction path of the poultry tenderloin extraction apparatus 30 is provided with the poultry tenderloin detachment bar 90.

Alternatively, a clean water injection nozzle may be provided instead of the poultry tenderloin detachment bar 90. With the clean water injection nozzle, when the clamping device 32 clamping the poultry tenderloin t returns through the retraction path, clean water can be injected onto the poultry tenderloin t with the clamping device 32 open, whereby the poultry tenderloin t can be easily detached from the clamping device 32. In this process, the poultry tenderloin t can be cleaned by the clean water injected thereon.

A cover film, made of a low friction material, may be formed on the upper surface 33a of the clamping lower plate 33 of the clamping device 32. In this configuration, the poultry tenderloin t is less likely to be stuck on upper surface 33a of the clamping lower plate 33, and thus can be easily dropped when the clamping device 32 is open.

Figure 13:
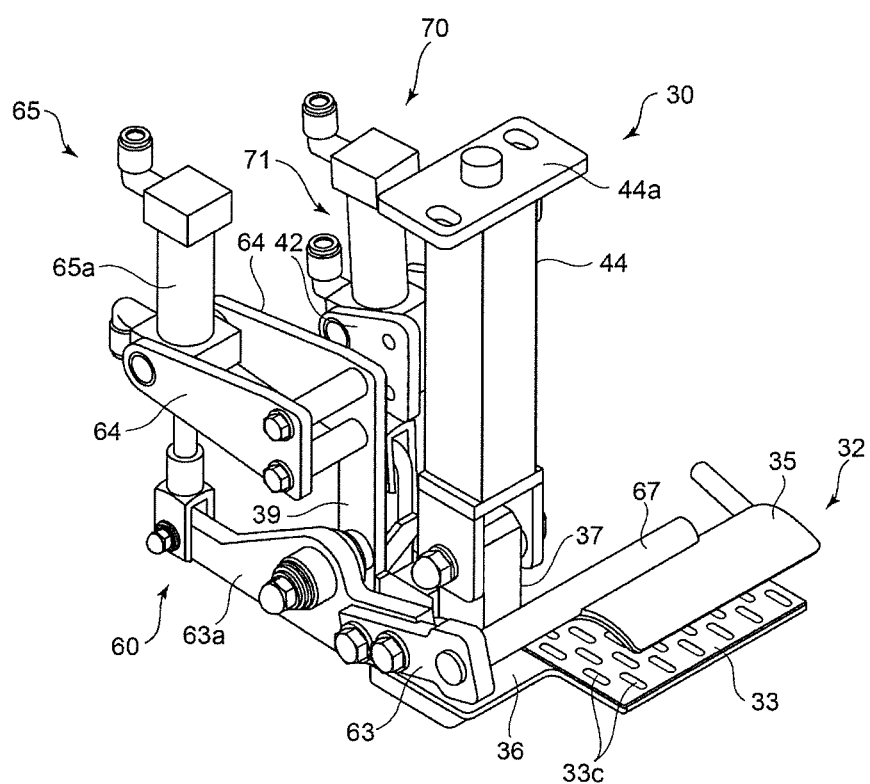
FIG. 13 is a left perspective view of a poultry tenderloin extraction apparatus according to another embodiment of the present invention.
Figure 14:
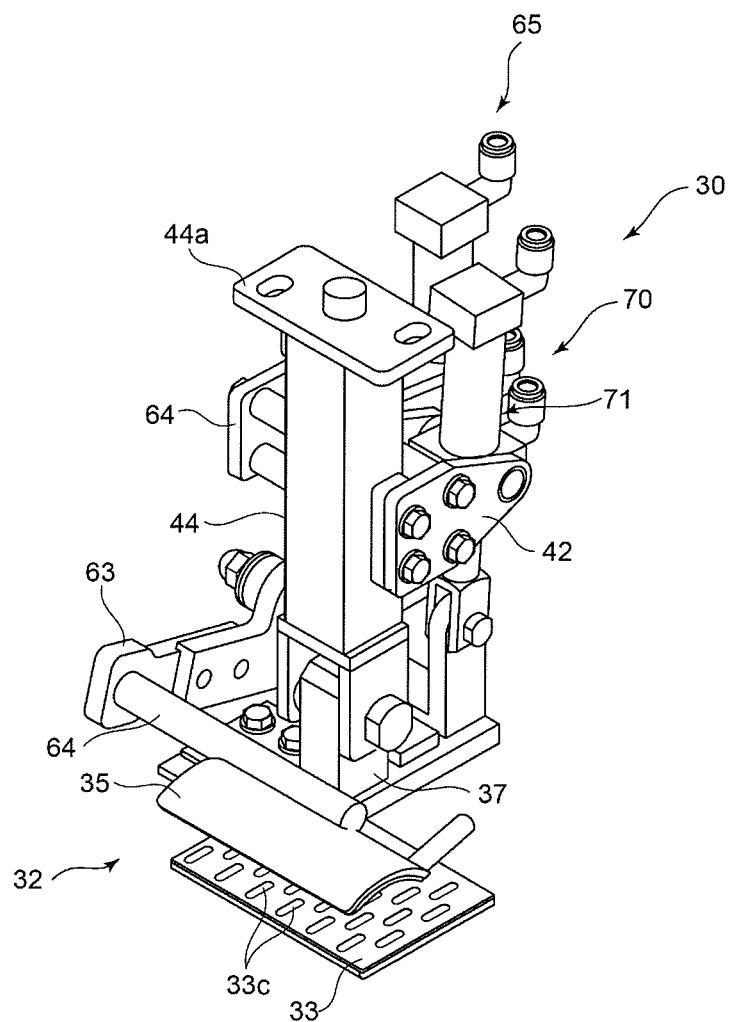
FIG. 14 is a right perspective view of the poultry tenderloin extraction apparatus according to the other embodiment of the present invention.

In the embodiment described above, the clamping device 32 has the clamping upper plate 35 provided with the plurality of long holes 35a, and has the clamping lower plate 33 provided with the plurality of protrusions 33b. Alternatively, as illustrated in FIGS. 13 and 14, the clamping upper plate 35 and the clamping lower plate 33 may respectively have lower and upper surfaces embossed to have a plurality of protrusions 33c. In this exemplary embodiment, the protrusions 33c, each having an ellipsoidal shape, are in a zigzag arrangement. The protrusions 33c may not have the ellipsoidal shape, and may have a circular shape, a rectangular shape, or the like. The plurality of protrusions 33c may be in the zigzag arrangement, or may be arranged while being separated from each other by the same distance. With the plurality of protrusions 33c provided on the lower surface of the clamping upper plate 35 and the upper surface of the clamping lower plate 33, the poultry tenderloin t clamped by the clamping upper plate 35 and the clamping lower plate 33 (see FIG. 12) is caught by the plurality of protrusions 33c so as not to fall off from the clamping device 32 in the retracting movement of the clamping device 32. Thus, the poultry tenderloin t can be certainly extracted from the poultry carcass.

In the present embodiment, the clamping upper plate 35 is connected to a supporting member 67 attached to a distal end side of the arm 63 by welding and the like. The supporting member 67 extends in a direction toward the pillar 44 that is orthogonal to a direction in which the arm 63 extends. With the clamping upper plate 35 thus attached to the arm 63 via the supporting member 67, the clamping device 32 can be freely arranged relative to the arm 63.

The invention claimed is:

1. A poultry tenderloin extraction apparatus for extracting poultry tenderloin from a poultry carcass which is eviscerated and which has leg portions and breast meat removed, the poultry tenderloin extraction apparatus comprising:
    a fixing jig configured to move while holding the poultry carcass;
    a poultry tenderloin extraction body section disposed on each of left and right sides with respect to a conveying direction of the fixing jig;
    a first moving unit configured to move the poultry tenderloin extraction body section toward the fixing jig which is moved; and
    a second moving unit configured to move the poultry tenderloin extraction body section away from the fixing jig which is moved,
    wherein the poultry tenderloin extraction body section includes a clamping device including: a clamping lower plate to be inserted under the poultry tenderloin in a longitudinal direction of the poultry tenderloin of the poultry carcass held by the fixing jig; and a clamping upper plate to be supported above the poultry tenderloin movably in an upper and lower direction, the clamping device being configured to clamp the poultry tenderloin between the clamping lower plate and the clamping upper plate when the poultry tenderloin extraction body section moves toward the fixing jig, and
    wherein the poultry tenderloin extraction apparatus is configured to, while the clamping device is clamping the poultry tenderloin between the clamping lower plate and the clamping upper plate, separate the poultry tenderloin from the poultry carcass by a movement of the fixing jig toward a front side in the conveying direction and a movement of the poultry tenderloin extraction body section away from the fixing jig by the second moving unit.

2. The poultry tenderloin extraction apparatus according to claim 1, wherein
    the clamping upper plate of the clamping device is disposed above and facing the clamping lower plate and is supported via an opening/closing mechanism unit configured to move the clamping upper plate toward and away from the clamping lower plate.

3. The poultry tenderloin extraction apparatus according to claim 1, wherein
    the first moving unit is provided to the poultry tenderloin extraction body section in such a manner that a distal end portion of the clamping device is oriented in a width direction relative to the longitudinal direction of the poultry tenderloin of the poultry carcass held by the fixing jig.

4. The poultry tenderloin extraction apparatus according to claim 1, wherein
the second moving unit is configured to move the poultry tenderloin extraction body section away from the fixing jig while a distal end portion of the clamping device is oriented in a width direction relative to the longitudinal direction of the poultry tenderloin of the poultry carcass held by the fixing jig.

5. The poultry tenderloin extraction apparatus according to claim 1, wherein
the first moving unit is configured to move the poultry tenderloin extraction body section toward the fixing jig in a direction inclined at an acute angle to the conveying direction of the fixing jig in plan view.

6. The poultry tenderloin extraction apparatus according to claim 1, wherein
the clamping lower plate is supported pivotally in the upper and lower direction about a fulcrum at the poultry tenderloin extraction body section and is connected to a retracting mechanism unit configured to permit the clamping lower plate to pivot about the fulcrum and to retract, when the clamping lower plate receives counter force involving an upper direction component while being in contact with the poultry carcass held by the fixing jig which is moved.

7. The poultry tenderloin extraction apparatus according to claim 1, further comprising:
a poultry tenderloin separation unit disposed on a retraction path in which the clamping device having the poultry tenderloin clamped therein moves away from the fixing jig, and configured to, when the clamping device is in a retracting movement, separate the poultry tenderloin from the clamping device by biasing the poultry tenderloin placed on the clamping lower plate while the clamping device is in a state where the clamping upper plate is open with respect to the clamping lower plate.

* * * * *